United States Patent [19]

Schulze

[11] Patent Number: 5,503,174
[45] Date of Patent: Apr. 2, 1996

[54] PROCESS FOR ACTUATING A SLIDE VALVE DESIGNED AS A MAGNETIC VALVE, MAGNETIC VALVE FOR CARRYING OUT SAID PROCESS

[76] Inventor: Eckehart Schulze, Stahlbuhlstrasse 36, D-7251 Weissach-Flacht, Germany

[21] Appl. No.: 117,071
[22] PCT Filed: Jan. 10, 1992
[86] PCT No.: PCT/EP92/00035
  § 371 Date: Oct. 28, 1993
  § 102(e) Date: Oct. 28, 1993
[87] PCT Pub. No.: WO92/15812
  PCT Pub. Date: Sep. 17, 1992

[30] Foreign Application Priority Data

Mar. 8, 1991 [DE] Germany .......................... 41 07 496.3

[51] Int. Cl.⁶ .................................................. F15B 13/044
[52] U.S. Cl. .................. 137/1; 137/625.65; 251/129.05; 251/129.1
[58] Field of Search ................... 137/1, 625.65; 251/129.05, 129.1

[56] References Cited

U.S. PATENT DOCUMENTS

| 3,129,724 | 4/1964 | Hartwig | 137/625.48 |
| 4,310,143 | 1/1982 | Determan | 137/625.65 X |
| 4,741,365 | 5/1988 | Van Ornum | 251/129.05 X |
| 4,859,005 | 8/1989 | Rey et al. | 137/596.17 |
| 4,979,542 | 12/1990 | Mesenich | 137/625.65 |

FOREIGN PATENT DOCUMENTS

| 231773 | 2/1964 | Austria | 137/625.65 |

*Primary Examiner*—Gerald A. Michalsky
*Attorney, Agent, or Firm*—Antonelli, Terry, Stout & Kraus

[57] ABSTRACT

A magnetic valve having spring-centered basic position, with a pulsed current of a relatively high frequency flowing through each of two exciter coils for setting alternate excited functional positions and for setting defined flow-cross sections in the respective functional positions. The pulsed direct currents undergo square-amplitude modulation so that current flows through the exciter coils alternately for time intervals $T_1$ and $T_2$. The frequency of the amplitude modulation having a period T is equal to a sum of the excitation time intervals $T_1$ and $T_2$ of the two exciter coils and is approximately 400 Hz. The magnetic valve has a central position rigidly mounted in a housing of the valve and a moveable valve element in a form of a soft iron sleeve which is also an armature of a double-stroke magnetic system. The functional position and deflection of the armature are chosen as a function of the ratio $T_1/T_2$ of the time intervals for which current alternately flows through the exciter coils.

8 Claims, 4 Drawing Sheets

PROCESS FOR ACTUATING A SLIDE VALVE DESIGNED AS A MAGNETIC VALVE, MAGNETIC VALVE FOR CARRYING OUT SAID PROCESS

FIELD OF THE INVENTION

The invention relates to a solenoid valve and a method for adjusting specific throughflow cross sections in alternative functional positions of the solenoid slide valve having a control magnet system including two exciting windings, which when alternately charged with current, or charged with different control currents, displace an armature provided for displacement of a valve body toward the single exciting winding or the more strongly energized exciting winding, with the armature having a spring-centered basic position which either corresponds to a specific open state of the valve in one of its two alternative functional positions or to an intermediate position, for example, a third functional position corresponding to the non-excited state of the magnetic system, and with the exciting currents used to excite the two magnetic windings being subjected to pulsed modulation, causing the armature together with the movable valve body to perform a constant reciprocating motion.

BACKGROUND OF THE INVENTION

In a known fashion, the friction existing between the movable valve body and the valve element of the valve that is integral with the housing, as soon as the valve is to be actuated, must be reduced to the relatively low value of sliding friction to ensure reliable response of the valve and especially to avoid the development of stick-slip effects, especially during the small strokes that correspond to only a fraction of the maximum control stroke. The time intervals within which certain functional positions and/or opening cross sections of flow paths in the valve are reached are kept as short as possible in this manner.

An exciting winding associated with one of the functional positions of the solenoid valve is energized, and a ripple is imposed on its exciting current that results in a pulsating rise and fall of the magnetic forces that "pull" the armature against the action of a return spring into its required position. This required position, which corresponds to a desired throughput cross section of the valve in this functional position, must result from the equilibrium of the magnetic positioning force generated by the excitation of the winding and by the restoring force of the respective acting valve spring, which increases with deflection of the armature. In order to achieve short switching times for solenoid valves controlled in this manner, powerful return springs must be used and high exciting currents must be generated to energize the exciting windings, powerful return springs to permit a rapid return of the armature to its basic position when the excitation is shut off, and high exciting currents in order to displace the armature sufficiently rapidly against the action of the powerful return springs. To accelerate the switching processes, as proposed in British 885,121, it is also possible, when shutting off the excitation of one exciting winding briefly, to excite the winding that produces magnetic forces in the opposite direction, but this would entail considerable control-engineering expense and/or considerable expense for additional control windings.

SUMMARY OF THE INVENTION

The goal of the invention is to provide an improved solenoid valve and a method for actuating a solenoid value which enables a more rapid response behavior of a double-stroke solenoid valve and the necessary mechanical deflections of the armature and the valve body movably coupled therewith, with comparatively low magnetic forces having to be imposed by the control magnet system.

According to the present invention, a method for adjusting throughflow cross-sections and alternative functional positions of a slide valve constructed as a solenoid valve having a control magnetic system which comprises two exciting windings is proposed with the method comprising the steps of alternately engaging or energizing with different control currents the two exciting windings so as to displace an armature providing for displacing a valve body toward the energized exciting winding. The armature has a spring-centered basic position corresponding to one of a specific opening state of the valve in one of the two alternate functional positions or to an intermediate position. The functional position is associated with the non-excited state of the magnetic system. The exciting currents used to excite the two magnetic windings are subjected to pulse modulation, as a result of which the armature and the movable valve body with it constantly perform a reciprocating movement, by which the friction existing between the movable valve body and the housing-integral element of the valve is constantly maintained at a relatively low level of sliding friction. The exciting windings are excited in a continuous rapidly alternating sequence for different time intervals $T_1$ and $T_2$, by the direction and amount of the deflection of the movable valve element being determined by the ratio of the exciting times $T_1$ and $T_2$, whereby a specific flow cross-section or resistance is adjusted for a selected functional position of the solenoid valve. A ratio of $T_1/T_2=1$ is assigned to the basic position of the movable valve element. The sum $T_1$ and $T_2$ of the exciting time intervals for which the exciting windings are energized is maintained sufficiently small so that the deflection amplitudes of the movements of the movable valve element which take place in the effective equilibrium positions are definitely less than a maximum actuating stroke thereof.

In accordance with the present invention, when the solenoid valve is actuated, two exciting windings are energized in a rapid, preferably periodic sequence, with a ratio of the different time intervals $T_1$ and $T_2$ during which first 1 and then the other exciting winding is energized with a pulsating direct current, being determined by both the selection of a switch position and a deflection stroke of the armature and the movable valve element of the solenoid valve. With a sufficiently high modulating frequency $f_m$, at which the exciting windings are actuated alternately with the same current but for different time intervals $T_1$ and $T_2$ for the duration of the direct current pulses, the mechanical inertia of the armature is used to create a situation in which the reciprocating movements of the solenoid valve armature that occur in phase with the modulating frequency, and hence of the armature, even when it has reached its equilibrium position in the middle position, have amplitudes that are small relative to the deflections of the armature from its spring-centered middle position. The exciting times $T_1$ and $T_2$ for which the exciting windings are alternately excited correspond to a predetermined constant value T, with the alternate excitation of the two exciting windings having a modulating frequency of $f_m=1/t$.

Since an overwhelming portion of the return forces which, when the respective functional position of the solenoid valve, determine the position of its movable valve element and hence the throughflow cross sections or flow resistances of its flow paths, are generated by the control magnet system itself, weakly dimensioned return springs may be used for relative spring centering of the armature, with the advantageous consequence that correspondingly weaker exciting currents can also be used to excite the magnet system and achieve a certain deflection stroke of the armature, so that with a given exciting current, a more sensitive, quicker-response behavior of a solenoid valve controlled according to the method of the invention is achieved.

If the ratio $T_1/T_2$ of the excitation time intervals $T_1$, $T_2$ for which, within a period with a time duration T, the exciting current modulation of the two exciting windings may be varied between 1/100 and 100/1, with this change taking place in such a manner that these time intervals are lengthened and shortened by equal incremental time intervals, with the result being a close approximation of a linear relationship between the changes in excitation time intervals $T_1$ and $T_2$ and the deflections correlated with them enhance movement of the armature from a resting position and/or a previously assumed position. By choosing sufficiently small steps for these time intervals, the deflections of the armature can be finely graduated so that, by utilizing an incremental amount of change for an opposite change in excitation time intervals $T_1$ and $T_2$, a uniform "digital" graduation of the deflections of the armature or movable valve body of a solenoid valve can be achieved. Incremental changes in these excitation time intervals $T_1$ and $T_2$ of 1/100 of a time duration T are readily feasible with existing means in electronic switching technology, implying, for practical operation, the possibility of a sufficiently constant variability of the deflection stroke of the armature of a solenoid valve controlled in this fashion.

In order to avoid as much as possible limiting the switching or adjustment times of the armature and the movable valve body of the solenoid valve to smaller values, it is advantageous to operate with values for a modulating frequency $f_m$ that are as high as possible, so that, with a modulating frequency of 100 Hz switching times of 10 ms are readily possible, and with higher modulating frequencies, up to 1 kHz, switching and/or adjustment times of about 1 ms are possible.

In a preferred embodiment of the method according to the invention, pulsed direct current is used as the exciting current, amplitude-modulated in the manner explained, with carrier frequency $f_i$ of the pulsed direct current being at least ten times greater than modulating frequency $f_m$ of its amplitude modulation, and preferably fifty to one hundred times higher. A current pulse generator provided as a current source for this purpose in a preferred embodiment is designed so that it also limits the direct current that is pulsed and flowing through the exciting windings, and, therefore, represents a current source connected in series with the consumer, with the internal resistance of the respective exciting winding, source being greater than the electrical resistance of the consumer. Then very low-resistance exciting windings can be used that permit short rise and fall times of the currents generating the magnetic forces, so that, in turn, the response times of a solenoid valve controlled in this manner can be shortened considerably. Similarly, the ohmic losses of the exciting windings and hence the development of heat in the magnetic system can be held to a favorably low level.

The solenoid valve of the present invention includes a piston-shaped valve element and a valve element that is sleeve-shaped and surrounds the latter coaxially, with two exciting windings, by whose alternate or common excitation, axial relative movements of the two valve elements are controllable in terms of direction and amount of deflection so that flow paths are assigned to alternate functional positions of the solenoid valve. The paths are formed by annular grooves of the valve element that mark the control edges as well as the transverse or lengthwise channels terminating in the annular grooves, corresponding to the travel-switching function of the valve can be adjusted to be alternately openable and closable and adjustable in terms of effective throughflow cross-section. The piston-shaped valve element is mounted integral with the housing and is fashioned of a non-magnetic material, with the sleeve-shaped valve element constituting the displacable armature of the control magnet system which includes the armature and exciting winding located coaxially with respect to a central longitudinal axis of the solenoid valve, side-by-side along the latter.

By fashioning the movable valve element as a sleeve-shaped armature of the magnet system and the valve element integral with the housing constructed as a solid piston, it is possible to provide a very light weight construction for the movable armature which, consequently, has a relatively small inertial moment that is very favorable for the control response behavior of the solenoid valve.

Similarly, the above-noted valve element can be made sufficiently large so that with a basic design of the valve as a three-position valve, a plurality (n) of pathways may be controlled with regard to their connections and throughflow cross-sections.

It is also feasible to provide a construction for a solenoid valve as a 4-3way valve and in an especially simple and space saving manner. For this purpose, in a 4-3way solenoid valve, with a P-pressure supply connection as well as A and B control outputs being guided through longitudinally extending holes in a fixed valve body which holes terminate in the annular grooves of the piston, by virtue of overlapping relationships, which differ in alternate axial positions of the movable valve element, the internal annular groove produces the path-switching function. A T-return connection communicates through an outer groove of the piston-shaped valve element with a tank arm of the solenoid valve. The arm is in communicating connection with an external longitudinally extending groove of the movable valve element with inner annular grooves thereof.

According to the present invention, the solenoid valve may be characterized by a thin-walled annular cylindrical sleeve made of a non-magnetizable material, preferably stainless steel inserted between a magnetic body surrounding the exciting windings as far as an annular gap, with a sleeve-shaped armature. The sleeve seals the space occupied by the magnetic body and exciting winding from an oil chamber of the solenoid valve.

With the sleeve made of a non-magnetizable material and coaxially surrounding the armature-piston of the solenoid valve, advantageously, the thin-walled sleeve may have a wall thickness of between 0.2 and 0.4 mm and, preferably, 0.3 mm, with an annular gap remaining between the sleeve and an outer jacket surface of the movable valve element having a radial width of between 0.05 and 0.2 mm and, preferably, 0.1 mm whereby an effective seal of the oil chamber of the solenoid valve against its magnetic bodies and the exciting windings surrounded by the chamber for the most part can be provided in a simple fashion.

Additionally, with the dimensional and constructional features, it is possible first to disturb the magnetic flux of the magnetic bodies in the magnetic system to the armature and from the armature back to the magnetic bodies to a sufficiently slight extent. Moreover, by virtue of the fact that a thin layer of oil can be formed between the sleeve and the armature, the ease of movement of the armature is reinforced.

The return springs provided to center the armature in the basic position of the solenoid valve can be made very much weaker than in conventional double-stroke solenoid valves, besides which the positions of maximum deflection of the armature are also protected by "magnetic stops," i.e. those positions in which, because of the shape of the magnetic gap, there is necessarily an equilibrium position for the armature even at maximum values of the exciting current.

The solenoid valve according to the invention is especially suitable for those applications in which rapid adjustment of specific positions and throughflow cross sections of the flow paths is required. In combination with position-required value-feedback devices, because of its rapid response behavior, it is very well suited as a position set-value control element, especially in connection with CNC-controlled hydraulic drives, since the precise controllability of specific armature positions also makes it suitable for "digital" control.

Additional details and features of the invention will be evident from the following description of a solenoid valve according to the invention with reference to the drawing as well as the description of the manner of its control.

DETAILED DESCRIPTION

Figure 1:
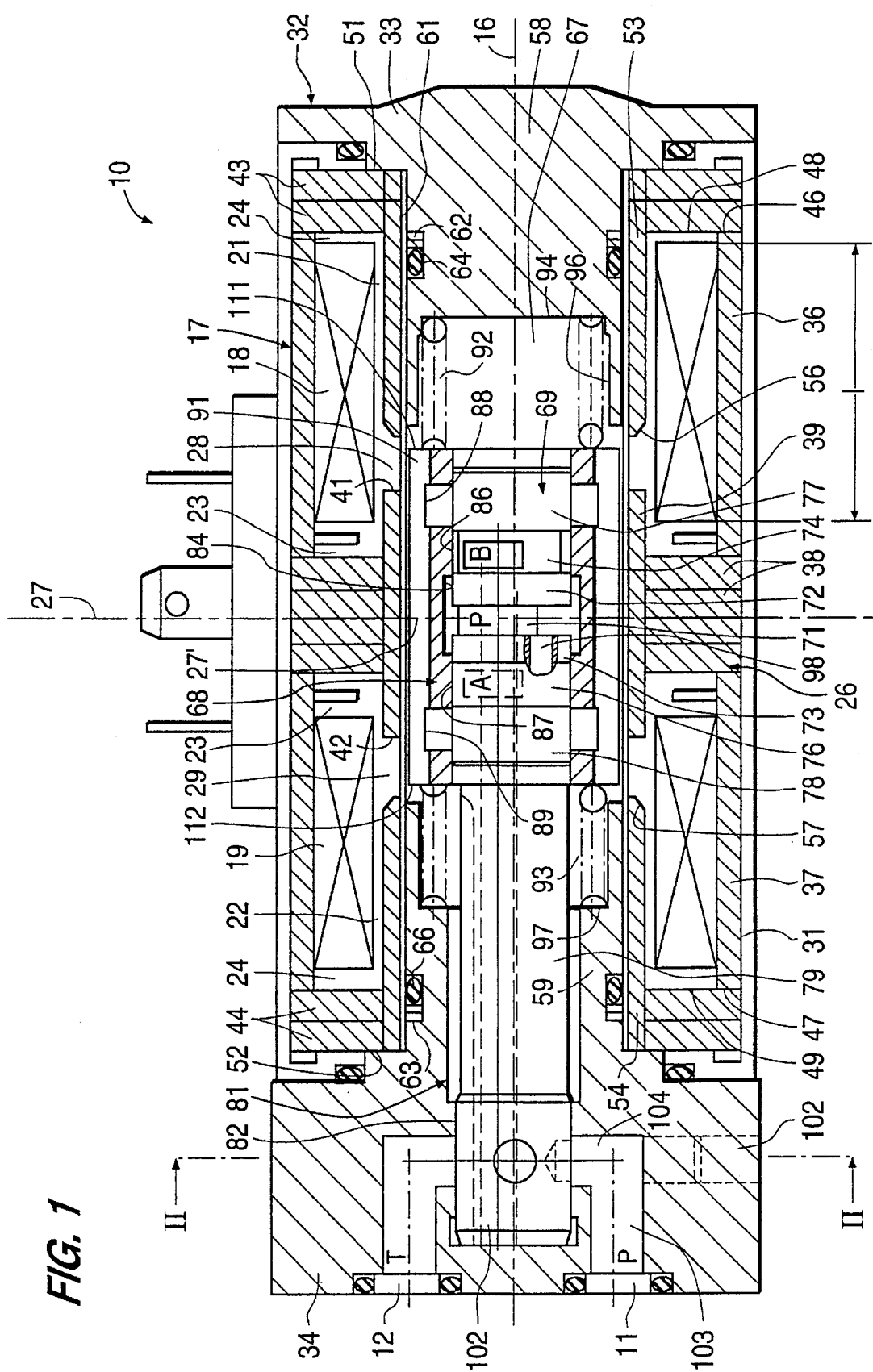
FIG. 1 is an enlarged cross-sectional view of a solenoid containing a central longitudinal axis, on a scale of 2:1, constructed in accordance with the present invention.
Figure 2:
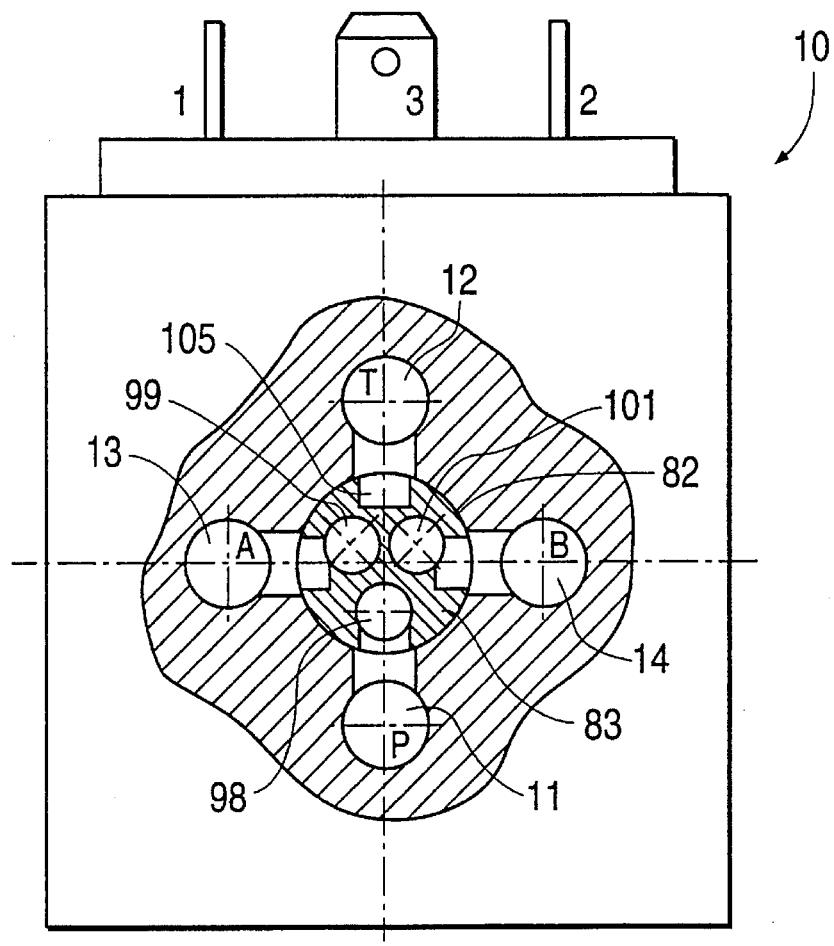
FIG. 2 is a partial cross-sectional view of a solenoid valve of FIG. 1 taken along the line II—II in FIG. 1.

Referring now to the drawings wherein like reference numerals are used throughout the various views to designate like parts and, more particularly, to FIGS. 1 and 2, according to these figures, a solenoid valve generally designated by the reference numeral 10, according to the invention, is constructed as a 4-3-way valve, having a P-pressure supply connection 11, to which the high pressure output of a pressure supply assembly (not shown) is connectable, a T-return connection 12 which is connected to a O-pressure supply container of the pressure supply system during operation, as well as a first A-control output 13 and a second B-control output 14 to the drive pressure chambers of a consumer (not shown), constructed, for example, as a double-acting hydraulic cylinder.

Figure 3:
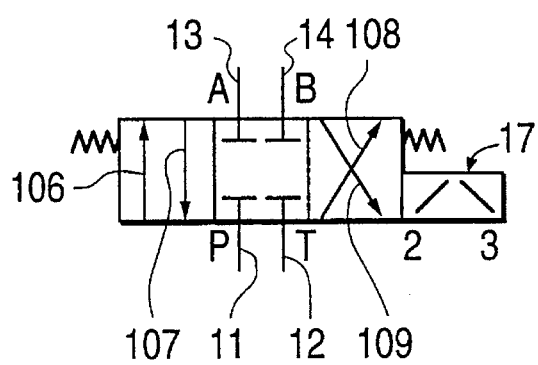
FIG. 3 is a schematic circuit diagram of the solenoid valve of FIG. 1.

The solenoid valve has, as a control system, a double-stroke magnetic system generally designated by the reference numeral 17, which is rotationally-symmetrical with respect to a central longitudinal axis of the solenoid valve 10. Identically constructed exciting windings 18 and 19 are arranged side-by-side as viewed in a direction of the longitudinal axis 16. Alternate excitation of the windings 18, 19 is achieved by a control current, whereby the solenoid valve is controllable from the basic position shown, in which the control outputs 13 and 14 are shut off from the P-supply connection and a return connection 12, alternately into an excited functional position in which the A-control output 13 is connected with the P-supply connection 11 and B-control connection 14 is connected with the T-return connection 12, or into a second excited position, in which the B-control output 14 is connected with the P-supply connection 11 and A-control output 13 is connected with the T-return connection 12 of the solenoid valve 10, as shown in FIG. 3.

The solenoid valve then enters the first excited functional position when the exciting winding 18 is energized and the other exciting winding 19 is not energized and enters the second excited functional position when the exciting winding 19 is energized and the exciting winding 18 is not energized.

The exciting windings 18, 19 are wound on cylindrical-jacket-shaped coil bodies 21, 22, made of an insulating plastic material having end flanges 23, 24 projecting radially outwardly, with the end flanges 23, 24 extending beyond the radial thickness of the exciting windings 18, 19. The exciting windings 18, 19 and associated coil bodies 21, 22, are embedded in a magnetic body generally designated by the reference numeral 26, with the coil bodies 21, 22 being fashioned of thorough magnetic material such as soft iron. The respective coil bodies 21, 22 are symmetrical with respect to a transverse central plane extending at right angles to the central longitudinal axis 16. The magnetic body 26, which, apart from two radially internal annular gaps 28, 29, associated with each of the two exciting windings 18, 19, completely surrounds the exciting windings 18, 19 and associated coil bodies 21, 22 in a magnetically conducting fashion. The magnetic body 26 includes an external substantially cylindrical-jacket-shaped plastic sheath 41 forming a generally jacket-shaped part of the valve housing generally designated by the reference numeral 32, closed off at opposite ends by sealing parts 33, 34, each having a solid block form, with the parts 33, 34 being made of a nonmagnetic material, for example, aluminum.

The magnetic body 26 comprising external jacket tubes 36, 37 which directly surround the exciting windings 18, 19 and directly abut the outer surfaces thereof, with the external jacket tubes 36, 37 extending only slightly axially beyond the cylindrical jacket surfaces of the radial flanges 23, 24 of the coil bodies 21, 22. Each of the coil bodies 21, 22, extending over their total length, expose a space available in the axial direction between inner radial flanges 23 and the inner annular ends, facing one another, of the outer jacket tubes 36, 37 of the magnetic body 26 and produce the magnetically-conducting connection between the outer jacket tubes 36, 37 and a central internal jacket tube 39, which, with its annular end faces 41, 42, forms the respective inner limits of annular gaps 28, 29. External annular disk-shaped yoke panels 43, 44, as viewed in an axial direction, fill the spaces between the annular ring-shaped end faces 46, 47 of the outer tubes 36, 37. Outer surfaces 48, 49 of the yoke panels 43, 44 fit flush against the outer jacket tubes 36, 37 and outer flanges 24 of the coil bodies 21, 22 as well as radial step areas 51, 52 located opposite them at an axial distance, of housing sealing parts 33, 34 and produce the magnetically conducting connection between outer jacket tubes 36, 37 and additional internal jacket tubes 53, 54, respectively. The additional internal jacket tubes 53, 54 likewise abut with their outer annular ring-shaped end faces, radial steps 51, 52 of the housing ceiling parts 33, 34 and, with conically-shaped face surfaces 56, 57, inclined inwardly, i.e., toward the central longitudinal axis 16 of the solenoid valve 10, form blade-shaped axial outward limits of the annual gaps 28, 29, by which the magnetic flux is also interrupted inside the magnetic body 26.

The two housing closures 33, 34 have pin-shaped projections pointing toward one another, extending to the vicinity of outer gap limits 56, 57, but ending at a short axial distance from them. The outer jacket surfaces of the projections are surrounded by a thin-walled tube 61 made of nonmagnetizable stainless steel, with the tube extending between radial step surfaces 51, 52 of housing closures 33, 34 over the entire extent of magnetic body 26, and is sealed off from these pin-shaped projections 58, 59 by annular seals 64, 66 inserted into external annular grooves 62, 63 of pin-shaped projections 58, 59, whereby the radially outer portion of valve housing 32, which receives magnetic body 26 and exciting windings 18, 19, is sealed off from interior chamber 67, filled with hydraulic oil during operation, of valve housing 32, which also forms the (pressureless) tank arm of the solenoid valve 10, which is kept in constant communication with the supply tank of the pressure supply assembly. On its radially outer side, the thin-walled metal tube, with a wall thickness of 0.3 mm, is surrounded directly by inner jacket tubes 39, 53, 54. The axially movable armature of double-stroke magnetic system 17 forms, in its basic shape, a circularly cylindrical tubular relatively thick-walled sleeve 68 of magnetizable soft iron material, which, when cut to length, is displaceably mounted with a sealing sliding seat on the annular-flange-shaped sections of a piston shaped valve element, mounted integral with the housing, and designated generally by the reference numeral 69. The sleeve 68 forms the movable slide of solenoid valve 10, which, when the exciting winding 18 of solenoid valve 10 is charged with a control current, is displaced rightward, while solenoid valve 10 reaches its first functional position and upon (alternate) energization of left exciting winding 19, causes solenoid valve 10 to move to its functional second position.

Piston-shaped valve element 69, as far as the arrangement of a central control groove 71, the P-control groove, is concerned, forms these laterally delimiting, flat-annular-flange-shaped ribs 72, 73. Through these control grooves delimited on the inside as viewed from a center of the solenoid valve 10, B-control groove 74 and A-control groove 76 as well as sections 77, 78 delimiting them externally and shaped like piston flanges, are made symmetrical with respect to the transverse central plane 27 of the magnetic body 26 of solenoid valve 10. The jacket surfaces of annular-flange-shaped ribs 72, 73 and piston-flange-shaped sections 77, 78 of piston-shaped valve element 69 forms sliding surfaces for movable valve element 68, the armature of double-stroke magnet system 17. The piston-shaped valve element 69, is located at the free end of piston rod 79, permanently inserted in a blind hole generally designated by the reference numeral 18 with the hole traversing pin-shaped extension 59 of housing sealing part 34 at the left in FIG. 1, terminating blindly within this projection 59, staggered in a block-shaped area of housing closing part 34, and with the end section 83 of the piston rod 79 being located in blind-ended hole stage 82 of the blind hole 81 fitted liquid-tight in this blind hole end stage 82 in such fashion that supply and control channels terminating radially in the hole stage 82 are not in communicating connection with one another.

Sleeve-shaped valve element 68, capable of axial reciprocating movement and forming the armature of double-stroke magnetic system 17 in the design thereof as a 4/3-way valve chosen to explain solenoid valve 10, regarding the provision of a central internal groove 84 as a P-switch groove, flat annular ribs 86, 87 delimiting the latter laterally and projecting radially inward, and internal grooves 88 and 89 of movable valve element 68, each delimited on the inside by the ribs and sealed from the P-switch groove. The internal grooves communicating with radially outward lengthwise grooves 91 thereof, which in turn terminate in the tank chamber 61 of valve 10, symmetrically relative to its cross sectional central plane 27 running at right angles to central longitudinal axis 16 of solenoid valve 10.

By virtue of weak as well as only slightly pretensioned valve springs 92, 93, creating return forces in opposite directions, of which springs one, valve spring 92, abuts bottom 94 of a blind hole 96 provided in housing closure 32 on the right in FIG. 1 and adjoins the end face of movable valve element 68. The end face is annular and faces the closure 32, and the other valve spring 93 axially abuts a radial stepped surface 97, staggered with respect to one another by the two hole stages of different diameters in blind hole 81 of the other housing sealing part 34, and abuts the annular end face of movable valve element 68 facing this radial stage surface 96, the latter, when neither of exciting windings 18 or 19 is charged with a control current, is urged into its neutral central position in which its transverse central plane 27' coincides with the transverse central plane or plane of symmetry 27 of magnetic body 26, and solenoid valve 10 assumes its basic position. Piston rod 79 is provided with three longitudinal channels 98, 99, 101, made from the end of piston rod 79 as holes in it, and again sealed pressure-tight by plugs 102. At the one in the middle in FIG. 2, lower transverse channel 98, by a short lengthwise hole 103 and a transverse hole 104, made radially in left sealing part 34, as indicated by the dashed lines and likewise sealed tight from the outside by a plug 83. Longitudinal channel 98, used for the P-feed, terminates inside one of the circular-segment-shaped milled areas of piston-shaped valve element 69, depending upon the interior cross section, in its P-control groove 71, which, by displacement of movable valve element 68 through overlapping of central inner groove 44 thereof is alternately bringable with A-control groove 76 or B-control groove 74 of piston-shaped valve element 69.

Similarly, longitudinal channel 99 of piston rod 79 is connected in communicating fashion with the A-control groove of the piston-shaped element 71 and with A-control output 13 of solenoid valve 10 as well as third longitudinal channel 101 with B-control groove 74 of piston-shaped valve element 71 and with B-control output 14 of the solenoid valve 10. T-connection 12 connected to the supply container of the pressure supply assembly terminates in an outer longitudinal groove 106 extending over the entire length of piston rod 79 and its end segment 83, through which interior 67 of solenoid valve 10 is kept in constantly communicating connection with the supply container of the pressure supply assembly. Through annular grooves 88, 89 terminating in outer lengthwise groove 91 of movable sleeve-shaped valve element 68, B-control groove 74 and its A-control groove 76 are relieved alternately to interior 67 of solenoid valve 10 and hence B-control connection 14 and A-control connection 13, alternately, to the supply container of the pressure supply assembly.

Solenoid valve 10 is designed in the given form for its housing-integral valve element 61 and its movable valve element 68 as a proportional valve, which, with increasing deflection of movable sleeve-shaped valve element 68 from its locking basic position, increasing the flow cross section, exposes its through flow path represented by 106 to 109 in the symbolic representation in FIG. 3, which in a first functional position leads from P-supply connection 11 to A-control output 13 and from B-control connection 14 to return connection 12 and a second in functional position from P-supply connection 11 to B-control output 14 and from A-control connection 13 to return connection 12.

In order to guarantee a bearing that is as low in friction as possible, as well as easy displaceability of movable valve element 68, the outside diameter of the sleeve-shaped valve element 68 is made slightly smaller, i.e. by 0.1 mm to 0.2 mm, than the inside diameter of thin-walled tube 61, so that an annular gap filled with hydraulic oil remains between the tube and movable sleeve-shaped valve element 68.

The length thereof measured between annular ring-shaped end faces 111 and 112 of movable sleeve-shaped valve element 68 is chosen so that when viewed in the basic position shown, the planes, running at right angles to central longitudinal axis 16 of the solenoid valve 10, of these end faces 111, 112 are located within the gap widths of annular gaps 28, 29, and of whose respectively external, blade-shaped limits 56, 57 are arranged at an axial spacing corresponding approximately to the maximum deflection stroke of movable valve element 68, which corresponds to approximately 1 mm.

To explain the type of control provided for solenoid valve 10 for energization of its exciting windings 18, 19, designed to permit as exact as possible an adjustment of the specific deflections of movable sleeve-shaped valve element 68, with the deflections being intended to be changeable in terms of their amounts in a specific fashion between maximum deflection and basic position, reference will now be made to the block diagram in FIG. 4.

A generator is provided as power supply 113, generating a pulsed direct current as the compensating current which varies pulsewise between a zero current strength and a maximum Mount $I_{max}$, with the pulse train frequency $f_t$ being 20 kHz in a typical design. The maximum value $I_{max}$ of this pulsed direct current with the suitable value being between 5 A and 20 A.

Power supply 113 is connectable by an electronic switch 116 or 117 to power supply terminal 118 of exciting winding 18 or supply terminal 119 of exciting winding 19. At a control voltage output 121 current generator 113 delivers a control voltage output signal that varies in synchronization with the current pulses between a high signal level (logical 1) and low signal level (logical 0). In addition, a modulation pulse generator 122 is provided which generates, with a frequency $f_m$, a periodic sequence of high-level voltage pulses 123 (logical 1) and low-level voltage pulses 124 (logical 0), from whose logical link to the control voltage pulses of current generator 113 control signals for electronic switches 116, 117 are produced, by which the latter are alternately controlled to assume their conducting and blocking states, whereby it is assumed of these electronic switches 116, 117 that they are switched to their conducting state when a high-level signal is applied to their control inputs 126, 127 as a control signal. Control input 126 of electronic switch 116, which in its conducting state links current output 114 of current generator 113 with supply terminal 118 of exciting winding 118, is fed by the output signal of an AND element 128, which, at a first, non-negated input 129, receives the control output signals of current generator 113 and at second, non-negated input 131, output pulses 123, 124 of modulation impulse generator 122.

The output signals of another AND-element 132 are fed to control input 127 of electronic switch 117 that controls the supply of current to second exciting winding 19, that at a non-negated first input 113 with the control voltage output signals of current generator 113 and at a negated second input 134 with the output pulses 123, 124 of modulating impulse generator 122.

The pulse train frequency $f_m$ of output pulses 123, 124 of modulating pulse generator 122 in the typical design or application thereof is 1/100 of pulse train frequency $f_t$ of the supply current pulses of the current pulse generator.

The scanning ratio, i.e. the ratio $t_1$ of the duration of high-level pulses 123 to their pulse interval T, which is equal to the sum $T_1+T_2$ with a duration $T_1$ of high-level impulses 123 and duration $T_2$ of low-level-impulses 124, can be adjusted between 0.01 and 99.

The function of the circuit explained thus far is as follows.

For duration $T_1$ of high-level output pulses 123 of modulating pulse generator 122, the output signal of AND element 128, by which electronic switch 116 is controlled, by which switch the current supply to exciting winding 18 is controlled, upon whose excitation solenoid valve 10 assumes its first functional position, a signal that varies in phase with the relatively high-frequency pulsed output direct current of current pulse generator 113, through which this electronic switch 116 is controlled in synchronization with the current output pulses of current pulse generator 113 in its conducting state and also supplies exciting winding 18 with exciting current. For this duration $T_1$ of level output pulses 123 of modulating pulse generator 122, the other AND element 132 is blocked, and similarly electronic switch 117 controlled by it, with the result that during this time interval $T_1$ the other exciting winding 19 is not excited. If the output signal of modulating pulse generator 122 is a low-level signal, the first-mentioned AND member 128 is blocked and the AND member 132 controlled by negated input 134 is activated so that it delivers control output pulses to electronic switch 117 for time interval $t_2$, so that the latter is switched in synchronization with the current output pulses of current pulse generator 113 in its conducting state, so that exciting winding 19 receives exciting current. In accordance with the different chronological effective values of exciting currents thus produced, for different scanning ratios of the output pulses of modulating pulse generator 122, correspondingly different "equilibrium deflections" occur in which movable valve element 68 still executes oscillatory movements with modulating frequency $f_m$, whose amplitudes increase as the scanning ratio approaches 0.5.

Figure 5:
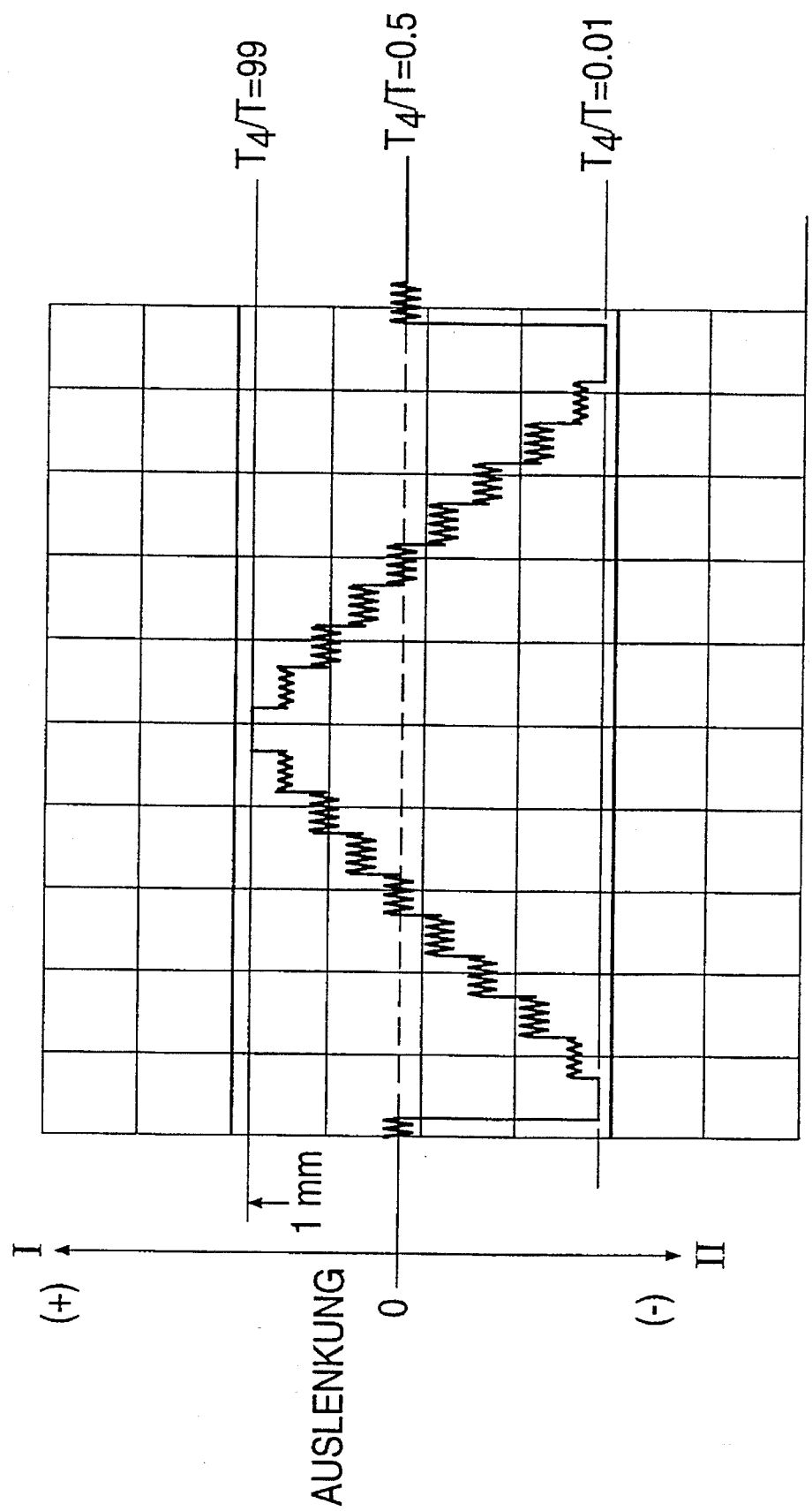
FIG. 5 is a schematic view depicting a functioning of the solenoid valve of FIG. 1.

To make this clearer, FIG. 5 shows a copy of a measurement record in which the deflection strokes of movable valve element 68 are plotted on the ordinate, whereby, to change the scanning ratio between 0.01 and 99 of the output pulses of modulating pulse generator 122, the pulse duration $T_1$ was altered in discrete steps of about 0.1 T each, and to check the reproducibility of the positions assumed by movable sleeve-shaped valve element 68, this change was performed in both the increasing and decreasing directions. With maximum deflection strokes of 1 mm, with a pressure drop of 20 bars across the solenoid valve in a design corresponding to the scale drawing in FIG. 1, the throughput throughflow volumes achieved were about 14 liters per minute, and bear a good linear relationship to the very precise adjustable deflections of movable sleeve-shaped valve element 68.

In order to ensure that electronic switches 116, 117, by which the supply of current output pulses from current pulse generator 113 reaches exciting windings 18, 19, are switched to their throughflow position for time intervals $T_1$ and $T_2$, the two AND elements 128, 132 can be followed in the circuit by "drop delay" timing elements 136, 137, which delay the drop of the output signals of the two AND elements 128 and 132 by about half the pulse interval t of the current output signals of current pulse generator 113.

Figure 4:
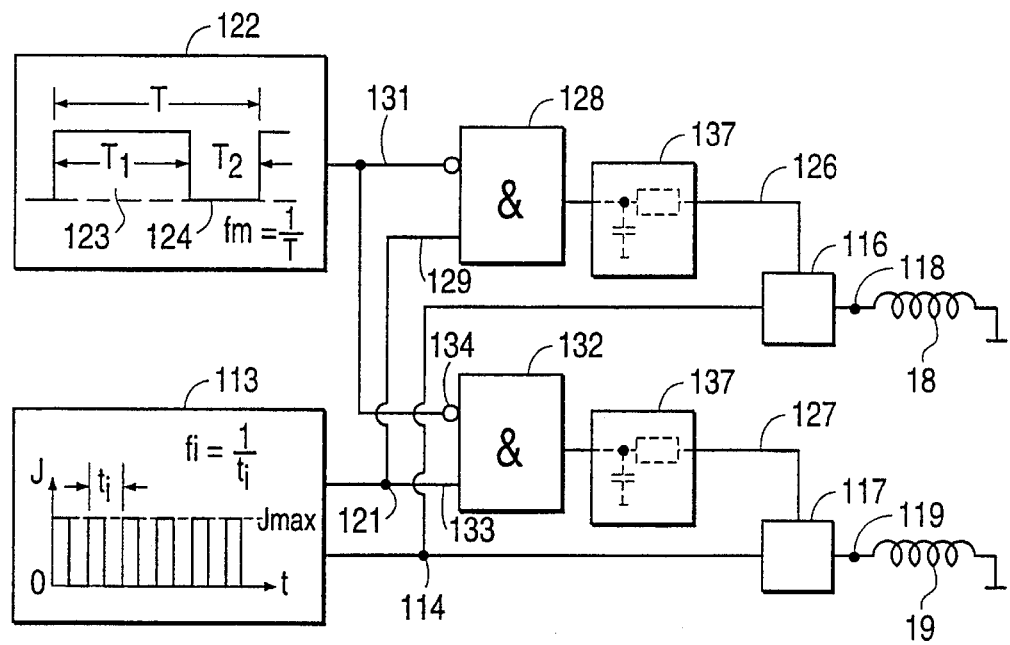
FIG. 4 is a schematic circuit diagram of a control arrangement for the magnet system of the solenoid valve of FIGS. 1–3.

Such delay or smoothing elements 137 can be designed as simple RC integration elements, as shown schematically in FIG. 4.

Figure 6:
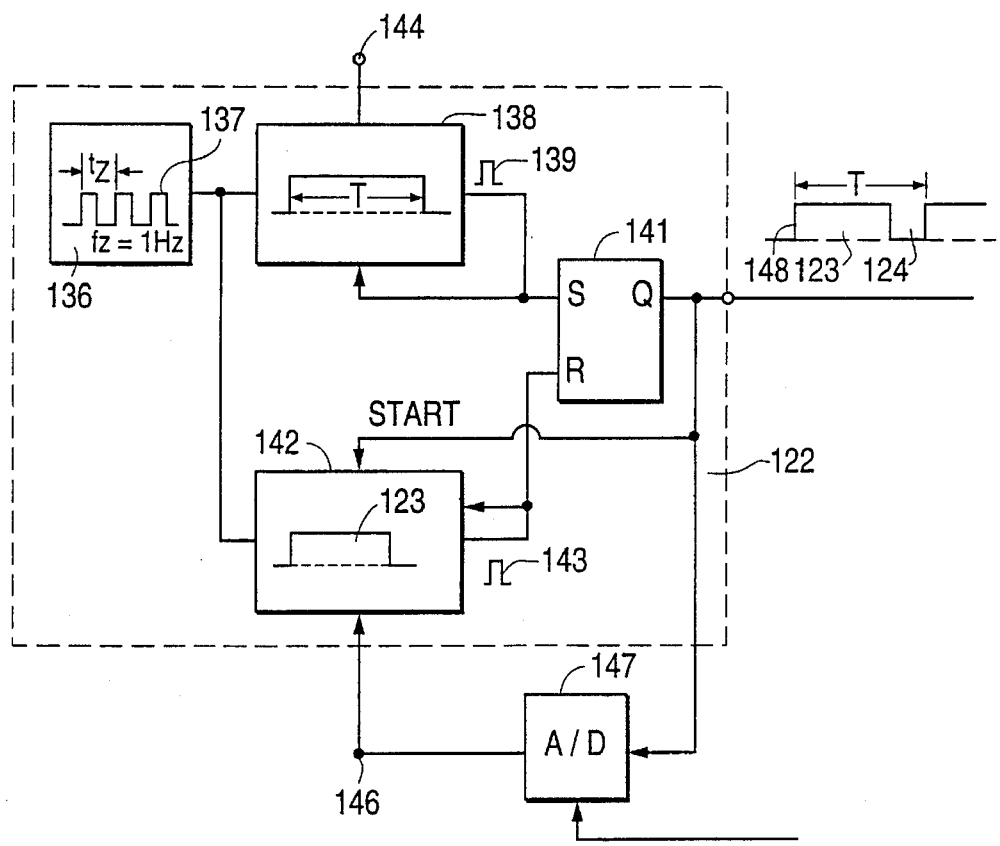
FIG. 6 is a graphical illustration of a modulating pulse generator in the schematic circuit diagram of FIG. 4.

Finally, with reference to FIG. 6, the theoretical design of a modulating pulse generator 122 suitable within the framework of the circuit shown in FIG. 4 is explained, by whose use for controlling the solenoid valve 10 according to the invention, diverse application of the latter is made possible.

This modulating pulse generator 122 comprises a clock 136, which continuously generates counting output pulses 137 with a pulse train frequency $f_z$ 100 to 1,000 times greater than the frequency $f_m$ with which the modulating output pulses of modulating pulse generator 122 are outputted.

These counting Output pulses 137 are fed to an adding first ring counter 138 that generates an output pulse 139 every time the counter status of this adding ring counter 138 reaches a value which, multiplied by pulse interval $T_z$ of the counting output pulses of clock 136, corresponds to the pulse interval T at which output pulses 123, 124 of modulating pulse generator 122 are outputted. By the output pulse 139 of adding ring counter 138, an SR flip-flop 141 is set to a high output signal level and simultaneously adding ring counter 138 is returned to the zero counter state. In addition, counter output pulses 137 are fed to a second adding ring counter 142, which generates an output pulse 143 of short duration whenever its counter status reaches a value which, multiplied by pulse interval $t_z$ of counting output pulse 137 of clock 136, corresponds to duration $T_1$ at which high-level output pulses 123 of modulating pulse generator 122 are to be delivered. This ring counter 142 is reset by its output pulses 143 to zero counter status as well.

As a result of output pulses 139 of ring counter 138 that determine period duration T of modulating output pulses of modulating impulse generator 122, flip-flop 141 is set to a high output signal level. As a result of output pulses 143 of ring counter 138 that determine pulse duration $T_1$ of high-level output pulses 123, flip-flop 141 is reset to a low output signal level. When the high-level output impulses 123 of flip-flop 141 are set, ring counter 142 is started, whose counting state determines duration $T_1$ of high-level output pulses 123 of modulating pulse generator 122. Period duration T of modulating output pulses 123, 124 of modulating pulse generator 122 can be fed through a supply input 144 of modulating pulse generator 122 to its first adding ring counter 138 as a counter end state. Similarly, pulse duration $T_1$ of high-level output pulses 123 of modulating pulse generator 122 can be fed through another supply input 146 of second adding ring counter 142 as a counter end state input. The scanning ratio of output pulses of modulating pulse generator 122 can be varied by this input. Through this additional input 146, the solenoid valve 10 can be controlled both by the outputs from a CNC control unit, or by hand, in other words by analog signals fed into second ring counter 142 through an analog/digital converter 147 as a "numerical value" that can be varied, with this input always being controlled in step with high-level output pulses 123 of flip-flop 141, advantageously with rising flanks 148 of these pulses.

I claim:

1. A method for adjusting throughflow cross-sections in alternate functional positions of a slide valve constructed as a solenoid valve having a control magnet system comprising two magnetic windings, the method comprising the steps of:

energizing the two magnetic windings so as to displace a moveable valve element toward an energized magnetic winding by an armature having a spring-centered position corresponding to one of a specific opening state of the slide valve in one of the alternate functional positions and to an intermediate position associated with a non-excited state of the control magnet system;

subjecting excitation currents used to excite the two magnetic windings to a pulse modulation such that the armature and the moveable valve element constantly execute a reciprocating movement thereby maintaining a constant low level of sliding friction between the valve body and a housing-integral element of the slide valve;

continuously exciting the magnetic windings in a continuous rapidly alternating sequence for different excitation time intervals $T_1$ and $T_2$;

determining a direction and amount of deflection of the moveable valve element in dependence upon a ratio of the excitation time intervals $T_1$ and $T_2$ so as to provide one of an adjusted specific flow cross-section and resistance for a selected functional position of the slide valve, wherein a ratio $T_1/T_2=1$ is assigned to the basic position of the moveable valve element; and determining the excitation time interval $T_1$ and $T_2$ so that the amount of deflection amplitudes of movements of the moveable valve element which take place in effective equilibrium positions are less than a maximum actuating stroke of the solenoid valve.

2. A method according to claim 1, wherein the step of energizing includes alternately energizing the two magnetic windings, and wherein a total of the time intervals $T_1$ and $T_2$ for which the magnetic windings are alternately excited corresponds to a predetermined constant value T, and wherein alternate excitation of the two magnetic windings is effected with a modulating frequency $f_m=1/t$.

3. A method according to one of claims 1 or 2, wherein the ratio $T_1/T_2$ is variable between 1/100 and 100/1.

4. A method according to one of claims 1 or 2, wherein a pulsed direct current is used as the excitation current for the two magnetic windings, and wherein a pulse sequence frequency $f_i$ is at least ten times greater than a modulating frequency $f_m$.

5. A method according to claim 4, wherein the pulse sequence frequency $f_i$ is 50 to 100 times greater than the modulating frequency $f_m$.

6. A method according to claim 4, wherein a frequency $f_m$ of the pulse modulation of varying duration is at least 100 Hz.

7. A method according to claim 6, wherein the pulse sequence frequency $f_m$ is between 400 Hz and 800 Hz.

8. A method according to claim 1, further comprising limiting the excitation current to the magnetic windings by presetting an internal resistance of an excitation current source.

\* \* \* \* \*